Nov. 21, 1933. C. C. FARMER 1,935,791
FLUID PRESSURE BRAKE
Filed March 11, 1930
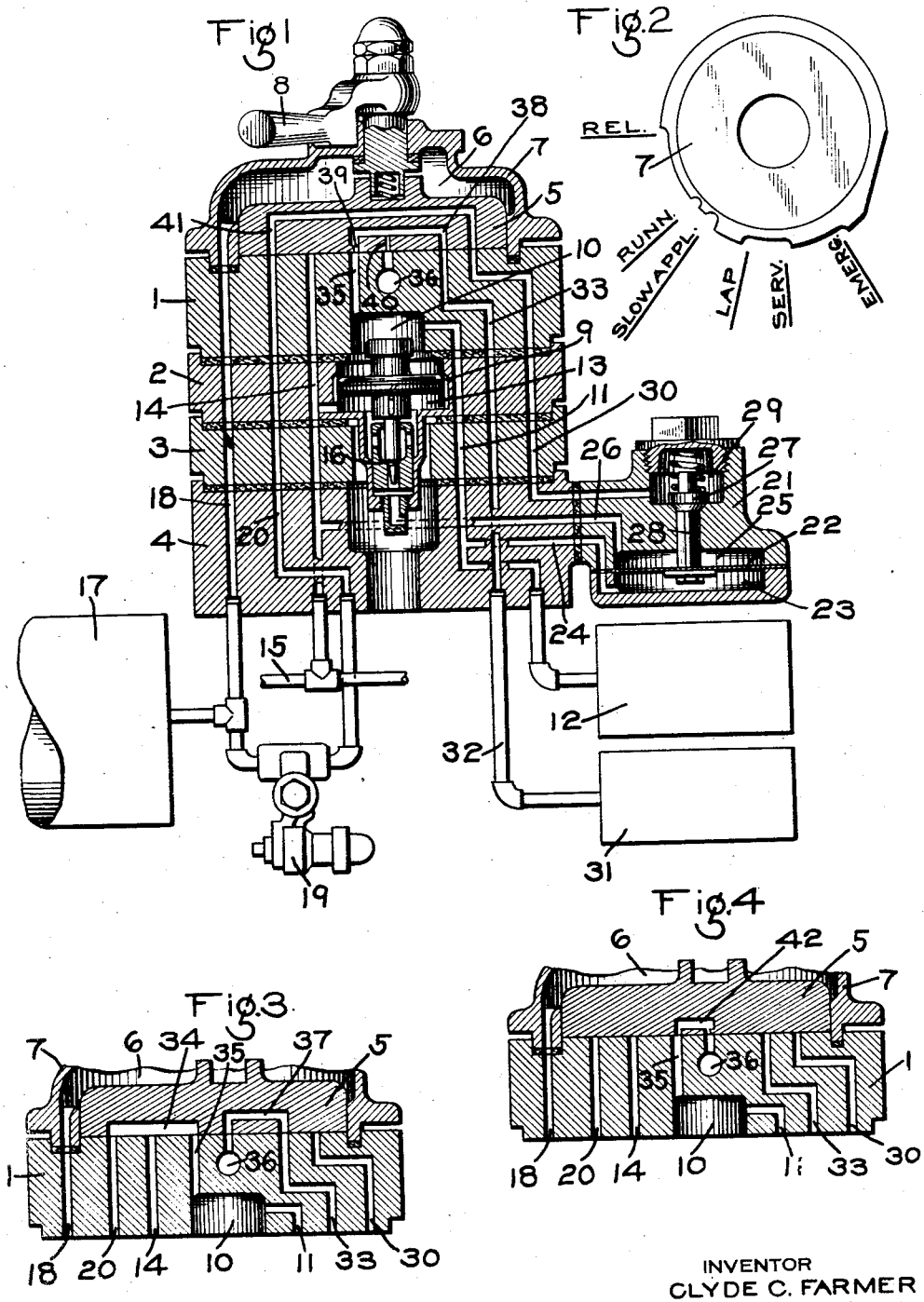
INVENTOR
CLYDE C. FARMER
BY Wm. M. Cady
ATTORNEY Patented Nov. 21, 1933

1,935,791

UNITED STATES PATENT OFFICE

1,935,791

FLUID PRESSURE BRAKE

Clyde C. Farmer, Pittsburgh, Pa., assignor to The Westinghouse Air Brake Company, Wilmerding, Pa., a corporation of Pennsylvania Application March 11, 1930. Serial No. 434,951

4 Claims. (Cl. 303—60)

This invention relates to fluid pressure brakes, and more particularly to an automatic brake system in which the brakes are applied by effecting a reduction in brake pipe pressure.

When effecting a service application of the brakes on a long train, it is very desirable that the application of the brakes on the front portion of the train be limited in degree, pending the application of the brakes on the cars at the rear portion of the train, in order to avoid producing a rate of deceleration in the speed of the front cars, such as to cause the running in of the slack in the train with a force likely to damage cars and lading.

This action is accentuated by the undesired degree of brake pipe reduction which results from the fact that the brake pipe pressure at the rear portion of the train is reduced as compared with the brake pipe pressure at the front portion of the train, as a result of brake pipe leakage and the frictional resistance to the flow of fluid through the brake pipe from the source of fluid pressure supply at the front end of the train to the rear portion of the train.

Under the above conditions, when the engineer's brake valve is moved out of running position, in preparation for effecting a service application of the brakes, thus cutting off the flow of fluid under pressure to the brake pipe, the initially higher brake pipe pressure at the front portion of the train is quickly reduced by flow to the rear portion, where the pressure is initially lower, thereby causing a reduction in brake pipe pressure at the front portion of the train, before any operation of the brake valve to effect a reduction in brake pipe pressure.

The degree of reduction in brake pipe pressure thus produced at the front portion of the train will vary according to the difference in brake pipe pressure between the front and the rear portions of the train, which difference is primarily due to the extent of brake pipe leakage.

The principal object of my invention is to obviate the above difficulty, and for this purpose, means are provided for controlling the reduction in brake pipe pressure at the front portion of the train, so that the reduction is limited to a predetermined amount, and if the rate of reduction tends to exceed a predetermined degree, fluid under pressure will be supplied to the brake pipe, so as to prevent the brake pipe pressure from reducing at a rate exceeding the predetermined desired rate.

In the accompanying drawing; Fig. 1 is a sectional view of an engineer's brake valve device embodying my invention; Fig. 2 a plan view of the brake valve quadrant, showing the different positions of the brake valve; Fig. 3 a sectional view of a portion of the brake valve device, showing the rotary valve in running position; and Fig. 4, a view similar to Fig. 3, showing the rotary valve in service application position.

The brake valve device may be of the usual construction comprising a casing formed of sections 1, 2, 3, and 4 secured together, the section 1 having a valve seat for a rotary valve 5, which valve is contained in a valve chamber 6, provided in the cover plate 7 and adapted to be operated by handle 8.

Mounted in the casing is the usual equalizing discharge valve mechanism comprising a piston 9 having the chamber 10 at one side connected, through a passage 11 with an equalizing reservoir 12 and having the chamber 13 at the opposite side connected, through a passage 14 with the usual brake pipe 15. The piston 9 is adapted to operate a discharge valve 16 for venting fluid under pressure from the chamber 13 and the brake pipe.

The usual main reservoir 17 is connected to a passage 18, leading to the valve chamber 6 and a feed valve device 19, of the usual construction supplies fluid at a reduced pressure from the main reservoir 17 to a passage 20, which leads to the seat of rotary valve 5.

According to my invention, a valve device is provided for supplying fluid under pressure to the brake pipe under certain conditions, comprising a casing 21, secured to the casing section 4 and containing a flexible diaphragm 22. The chamber 23 at one side of the diaphragm is connected through passage 24 with passage 11, and the chamber 25 at the opposite side is connected through passage 26, with passage 14 and the brake pipe 15.

The diaphragm 22 controls the operation of a valve 27, said valve having a stem 28, which is adapted to be operated by the diaphragm. The valve 27 controls connection from valve chamber 29 to chamber 25, and chamber 29 is connected to a passage 30, leading to the seat of rotary valve 5. A reduction limiting reservoir 31 is provided and said reservoir is connected, through pipe 32, with a passage 33, leading to the seat of rotary valve 5.

In the running position of the brake valve, passage 20 is connected, through cavity 34 in the rotary valve 5, both with passage 14, leading to the brake pipe 15, and to passage 35, leading to piston chamber 10, so that the brake pipe and the equalizing reservoir 12 are charged with fluid at the usual reduced pressure, as supplied by the feed valve device 19. The reduction limiting reservoir 31 is connected to an atmospheric exhaust port 36, through passage 33, and cavity 37, in rotary valve 5, so that in running position, the reservoir 31 is maintained at atmospheric pressure.

If it is desired to effect a slow application of the brakes, where the train is long, the rotary valve is turned to the slow application position as shown in Fig. 1, in which the reduction limiting reservoir 31 is connected to chamber 10, through passage 33, cavity 38 in rotary valve 5, and passage 35. The pressure in the chamber 10 and in the connected equalizing reservoir 12 is thus reduced by equalization into the reduction limiting reservoir 31.

The volume of the reduction limiting reservoir preferably bears such a relation to the volume of the equalizing reservoir that a reduction of from five to six pounds is made in the pressure of the equalizing reservoir.

A restricted port 39 in the cavity 38 limits the rate of flow from the equalizing reservoir 12 to the limiting reservoir 31 and is preferably such that it corresponds substantially with the usual preliminary discharge rate provided in the usual brake valve, for example, so that the equalizing reservoir pressure reduces at the rate of about twenty pounds in ten seconds.

Fluid is also vented from the equalizing reservoir and the reduction reservoir to the atmosphere through a restricted port 40, and at a rate, for example, of about fifteen pounds in one minute, or a much slower rate than that at which the equalizing reservoir equalizes into the reduction limiting reservoir.

If, during the time the brake valve is in the slow application position, the brake pipe pressure should tend to fall below the pressure in the equalizing reservoir, by reason of leakage of fluid from the brake pipe, then the lower brake pipe pressure in chamber 25 will be overcome by the higher equalizing reservoir pressure in chamber 23, and consequently the diaphragm 22 will be operated to unseat the valve 27. In the slow application position a cavity 41 in the rotary valve 5 connects passage 20 with passage 30, so that fluid at feed valve pressure is supplied to valve chamber 29. When valve 27 is unseated, fluid at feed valve pressure is then supplied to chamber 25 and thence through passage 26 to the brake pipe 15.

Thus leakage from the brake pipe is prevented from reducing the brake pipe pressure below the pressure in the equalizing reservoir, and consequently the reduction in brake pipe pressure at the front portion of the train is determined by the relative volumes of the equalizing reservoir and the reduction limiting reservoir and the size of the restricted ports 39 and 40.

The reduction in pressure in the equalizing reservoir permits the brake pipe pressure acting in chamber 13 to operate piston 9 and unseat the discharge valve 16, so that fluid under pressure is vented from the brake pipe in the usual manner.

It will thus be seen that in the handling of long trains, by placing the brake valve in slow application position, the degree of reduction in brake pipe pressure is initially limited by equalization of the equalizing reservoir into the reduction limiting reservoir at a slow rate and then the further reduction in brake pipe pressure is restricted to the rate at which fluid can flow from the equalizing reservoir and the reduction limiting reservoir to the atmosphere by way of the restricted port 40. Any greater rate of reduction in brake pipe pressure, due to leakage of fluid from the brake pipe, than that determined by the restricted port 40 is prevented by the operation of the valve 27, which opens to supply fluid to the brake pipe in case the brake pipe pressure should tend to reduce below the pressure in the equalizing reservoir.

After the brakes have been applied throughout the train with the brake valve devices in slow application position, the brake valve may be turned to the usual service position, in which, as shown in Figure 4, fluid under pressure is vented from the equalizing reservoir to the atmosphere through cavity 42 in the rotary valve 5.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, an equalizing reservoir, and a valve device subject to the opposing pressures of the brake pipe and the equalizing reservoir and operated upon a reduction in equalizing reservoir pressure for venting fluid from the brake pipe, of a reduction limiting reservoir and manually controlled valve means for venting fluid from the equalizing reservoir to the reduction reservoir at a restricted rate and simultaneously to the atmosphere at a slower restricted rate.

2. In a fluid pressure brake, the combination with a brake pipe, an equalizing reservoir, and a valve device subject to the opposing pressures of the brake pipe and the equalizing reservoir and operated upon a reduction in equalizing reservoir pressure for venting fluid from the brake pipe, of manually controlled valve means for venting fluid from the equalizing reservoir, means for effecting a venting of fluid from the equalizing reservoir by said valve means at a rate in excess of the rate at which the usual preliminary discharge port vents fluid from the equalizing reservoir, and a valve device operated upon a reduction in brake pipe pressure below the pressure in the equalizing reservoir while the equalizing reservoir pressure is being reduced by flow to the reduction reservoir for supplying fluid under pressure to the brake pipe.

3. In a fluid pressure brake, the combination with a brake pipe, an equalizing reservoir, and a valve device subject to the opposing pressures of the brake pipe and the equalizing reservoir and operated upon a reduction in equalizing reservoir pressure for venting fluid from the brake pipe, of a reduction limiting reservoir, and a brake valve device having a service application position in which fluid is vented from the equalizing reservoir, and having a slow application position in which fluid is vented from the equalizing reservoir to the reduction limiting reservoir at a predetermined restricted rate.

4. In a fluid pressure brake, the combination with a brake pipe, an equalizing reservoir, and a valve device subject to the opposing pressures of the brake pipe and the equalizing reservoir and operated upon a reduction in equalizing reservoir pressure for venting fluid from the brake pipe, of a reduction limiting reservoir, a brake valve device having a service application position in which fluid is vented from the equalizing reservoir and having a slow application position in which fluid is vented from the equalizing reservoir to the reduction limiting reservoir, and a valve device operative in the slow application position upon a reduction in brake pipe pressure below that in the equalizing reservoir for supplying fluid under pressure to the brake pipe.

CLYDE C. FARMER.